United States Patent
Gratzel et al.

(10) Patent No.: US 7,271,334 B2
(45) Date of Patent: *Sep. 18, 2007

(54) PHOTOCATALYTIC FILM FOR THE CLEAVAGE OF WATER INTO HYDROGEN AND OXYGEN

(75) Inventors: Michael Gratzel, Sulpice (CH); Ravindranathan Thampi, Ecublens (CH)

(73) Assignee: The Hydrogen Solar Production Company Limited, London (GB)

( * ) Notice: Subject to any disclaimer, the term of this patent is extended or adjusted under 35 U.S.C. 154(b) by 464 days.

This patent is subject to a terminal disclaimer.

(21) Appl. No.: 10/343,272

(22) PCT Filed: Jul. 29, 2001

(86) PCT No.: PCT/EP01/08762

§ 371 (c)(1),
(2), (4) Date: Jan. 27, 2003

(87) PCT Pub. No.: WO02/09876

PCT Pub. Date: Feb. 7, 2002

(65) Prior Publication Data

US 2003/0121543 A1    Jul. 3, 2003

(30) Foreign Application Priority Data

Jul. 29, 2000 (EP) ................... 00810691

(51) Int. Cl.
 *C25B 9/00*   (2006.01)
 *H01L 31/00*   (2006.01)
(52) U.S. Cl. ............... 136/263; 204/242; 204/258
(58) Field of Classification Search ........ 136/243–265; 204/155–158.21, 242, 258
See application file for complete search history.

(56) References Cited

U.S. PATENT DOCUMENTS

| 4,650,554 A | * | 3/1987 | Gordon | 205/340 |
| 6,204,545 B1 | * | 3/2001 | Nakata | 257/459 |
| 6,936,143 B1 | | 8/2005 | Graetzel et al. | 204/242 |

FOREIGN PATENT DOCUMENTS

| EP | 1473745 A1 | 11/2004 |
| JP | 01-232966 | 9/1989 |
| JP | 08-089804 | 4/1996 |
| JP | 11-197512 | 7/1999 |
| JP | 11-268158 | 10/1999 |
| WO | WO0102624 A1 | 1/2001 |

* cited by examiner

*Primary Examiner*—Nam Nguyen
*Assistant Examiner*—Jeffrey Barton
(74) *Attorney, Agent, or Firm*—Schneck & Schneck; Thomas Schneck (57) ABSTRACT

The Photocatalytic film of semiconducting iron oxide ($Fe_2O_3$), contains an n-dopant, or a mixture of n-dopants, or a p-dopant or a mixture of p-dopants. Electrode consists of a substrate, with one or more films or photocatalytic arrangements of film of semiconducting n-doped or p-doped iron oxide ($Fe_2O_3$) e.g. on the surface of one side of the substrate or on the surface of different sides. The photoelectrochemical cell comprises electrodes with a film or with films of the n-doped or p-doped semiconducting iron oxide ($Fe_2O_3$). The semiconducting iron oxide ($Fe_2O_3$) film can be manufactured with a spray pyrolysis process or a sol gel process. The system for the direct cleavage of water with visible light, into hydrogen and oxygen the system comprises one or more of the photoelectrochemical cells with photocatalytic films. The system can be a tandem cell system, comprising the photoelectrochemical cell with the doped iron oxide ($Fe_2O_3$) film.

10 Claims, 6 Drawing Sheets

Figure 1    Current – Voltage (I–V) characteristics of $Ti^{4+}$ doped iron oxide layers at various doping levels.

Figure 2  Current – Voltage (I-V) characteristics of $Sb^{5+}$ doped iron oxide layers at various doping levels Figure 3    Photocurrent action spectra of doped and undoped iron oxide; Inset: Absorption spectra of iron oxide.

Figure 4   Photocurrent action spectra of 5 atom % $Ti^{4+}$ doped iron oxide; Inset: absorption spectra of iron oxide by varying thickness.

Figure 5   I-V characteristics of iron oxide in the presence of sodium lactate as a sacrificial donor. Supporting electrolyte is Na $ClO_4$ at pH=1.06.

Fig. 6

PHOTOCATALYTIC FILM FOR THE CLEAVAGE OF WATER INTO HYDROGEN AND OXYGEN

FIELD OF THE INVENTION

The present invention relates to a photocatalytic film of iron oxide according to the preamble of claim 1. The invention relates further to an electrode with such a film, to a method of producing such a film and to the precaution of an electrode composed of iron oxide ($Fe_2O_3$) which upon illumination with light oxidizes water to oxygen with high quantum efficiency and a system with such an electrode in a tandem cell for water cleavage by visible light or sunlight.

It is known that iron(III) oxide is a semiconductor that produces oxygen from water tinder illumination. The reaction involves positive charge carriers (holes) generated in the valence band of the oxide by photo-excitation with light whose energy exceeds the band gap energy of the semiconductor. In contrast to most oxides the band gap of iron oxide is sufficiently small, i.e. 2.2 electron volts, to allow photoexcitation by visible light. This renders it attractive for use as a photo-catalyst in a system affording the cleavage of water by sunlight. However the photo-oxidation of water is notoriously inefficient on $Fe_2O_3$ unless single crystal electrodes are employed, whose cost is prohibitively high for practical applications.

The task of the present invention is to provide an improved photocatalytic film and an electrode with such a film or such films. Further it is an object of the invention to provide for a method for producing an improved polycrystalline film of iron oxide that e.g. accomplishes tie photooxidation of water in an efficient manner. Another object of the invention is an improved system for the cleavage of water. The film can be used in a tandem cell accomplishing the complete cleavage of water into hydrogen and oxygen by sunlight.

The photocatalytic film of iron oxide is characterized by the features of the characterizing part of claim 1. The electrode according to the invention shows the features of the characterizing part of claim 5. The method of producing the film is characterized by the features of the characterizing part of claim 8. And the system for cleavage of water with visible light contains one or more of the photoelectrochemical cells according to the invention.

DESCRIPTION OF THE INVENTION

The invention and in particular the photoelectrochemical properties of the film and the electrode are illustrated by way of example by tie accompanying diagrams.

A method is disclosed for the preparation of an electrode constituted by a compact polycrystalline $Fe_2O_3$ film supported on a conducting glass. The latter serves as a transparent electric current collector. The film is an n-type semiconductor, electrons being the majority carriers and holes the minority charge carriers or a p-type semiconductor. The n-doping is achieved by introducing a suitable substitutional dopant into the $Fe_2O_3$ lattice. When placed in contact with the electrolyte a depletion layer is formed at the semiconductor surface. The electric field present in the space charge layer assists in the separation of electron-hole pairs produced by light excitation of the oxide. This effect is critical in order to obtain high quantum yields for photocatalytic oxygen evolution on $Fe_2O_3$. Other factors that control the efficiency of the $Fe_2O_3$-films are the minority carrier diffusion length determined by impurities or lattice imperfections and the presence of surface states acting as recombination centers. The latter factors are very unfavorable for conventional $Fe_2O_3$ films impairing its operation as an anode for photocatalytic water oxidation. The method disclosed in the present invention overcomes these material problems.

Spray pyrolysis is a process where a solution containing the constituents of the film to be produced is e.g. sprayed onto a heated or hot substrate. The solvent evaporates or boils of and the film is produced by pyrolysis of the remaining constituents contained in the solvent.

An alternative for the production of films is the sol gel process.

WORKING EXAMPLE

Preparation of $Fe_2O_3$ films on conducting glass and photoelectrochemical characterization: A spray pyrolysis procedure was employed to prepare $Fe_2O_3$, layers. An alcoholic (2-propanol) solution containing 0.1M $FeCl_3.6H_2O$ and 0.1 M HCl was sprayed on to a uniformly heated (380° C.) conducting glass open to an air atmosphere. The spray gun was operated using nitrogen as a carrier cum atomizing gas. Substitutional doping of other elements such as Ti, Sb, Si, etc. were introduced into the $Fe_2O_3$ film by premixing suitable precursors (chlorides, for example) in the $FeCl_3$ solution employed for the spray pyrolysis. These dopants are able to augment the number of the majority carriers (electrons). The spray time was fixed at 10 seconds, each time. The time interval between two consecutive spraying acts was 10 minutes. Multiple spraying was used to increase the layer thickness and producing an arrangement of films consisting of two or more layers of the film.

Figure 1:
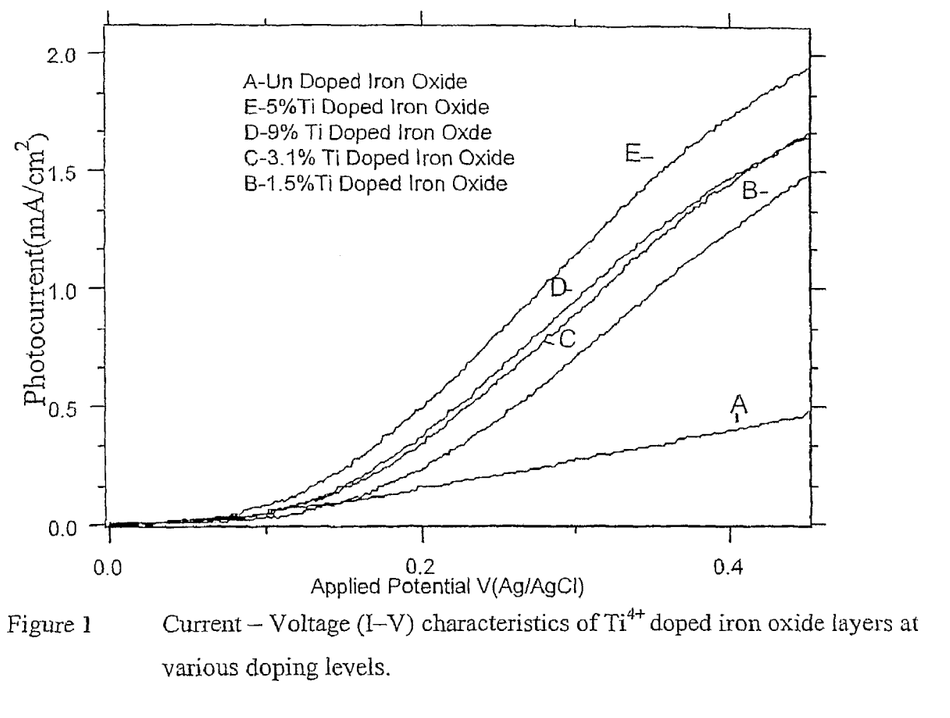
FIG. 1 shows the current-voltage (I-V) characteristics of $Ti^{4+}$ doped iron oxide films or layers of various doping levels.
Figure 2:
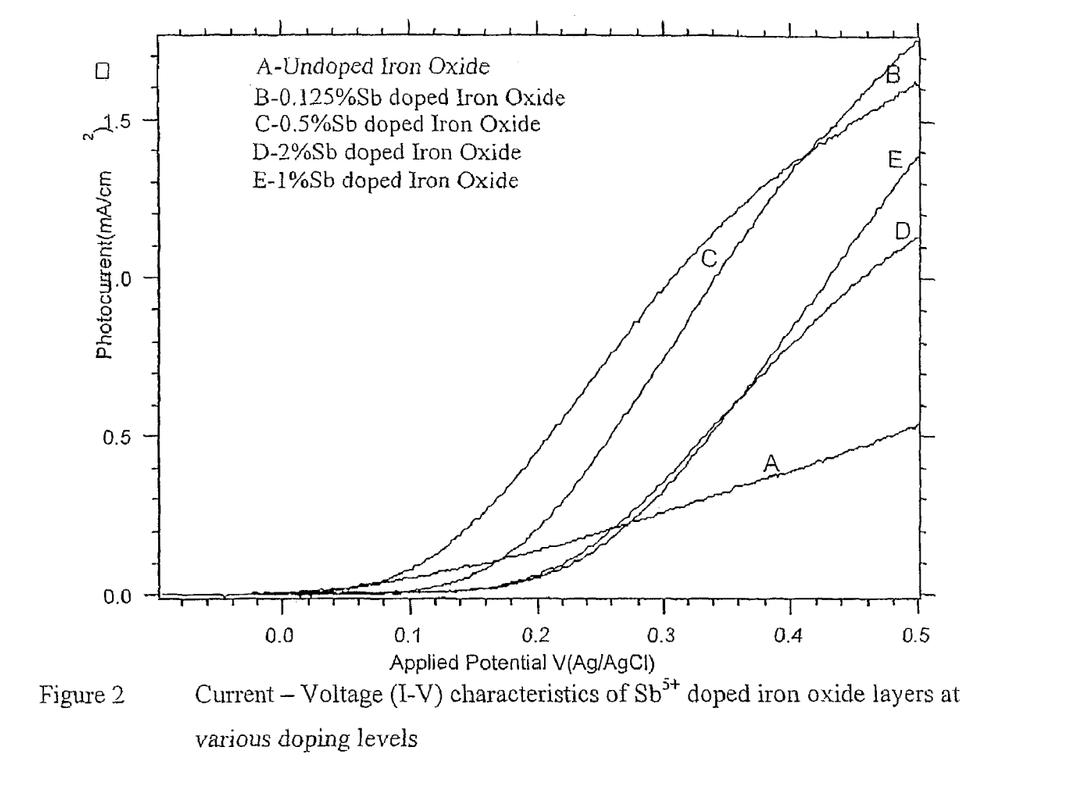
FIG. 2 shows the current-voltage (I-V) characteristics of $Sb^{5+}$ doped iron oxide films or layers of various doping levels.

A three electrode (working, counter and reference) setup was used for evaluating the electrochemical performance of the finished electrodes. Upon contacting the $Fe_2O_3$ film with the aqueous electrolyte, a depletion layer is formed whose electric field assists in the separation of electron-hole pairs generated by light. This drives electrons to the bulk and then to the external circuit and the holes to the $Fe_2O_3$ surface where they oxidize water to oxygen. Concomitantly at the Pt counter electrode, or counter-electrode made of another conducting material, $H_2$ is liberated as a result of the reduction reaction. Alternative materials to platinum for use as a counter-electrode are for example nickel or polytungstate derivatives supported on a conductive substrate. In FIGS. 1 and 2, the anodic photocurrent is plotted as a function of the electrode potential for various $Fe_2O_3$ electrodes. The effect of the dopant is to augment strongly the photocurrent at a given potential. An almost 4 fold increase of the photocurrent is obtained, under reverse bias. Within the range of concentrations employed, $Ti^{4+}$ doping showed the best performance at 5 atom % (FIG. 1). With $Sb^{5+}$, this was observed at 0.125 atom % (FIG. 2). Both the onset potential of the photocurrent and its maximum value were taken for such comparison. By contrast, substitution of iron by silicon which is most frequently used to n-dope iron oxide did not improve the performance of the films.

Figure 3:
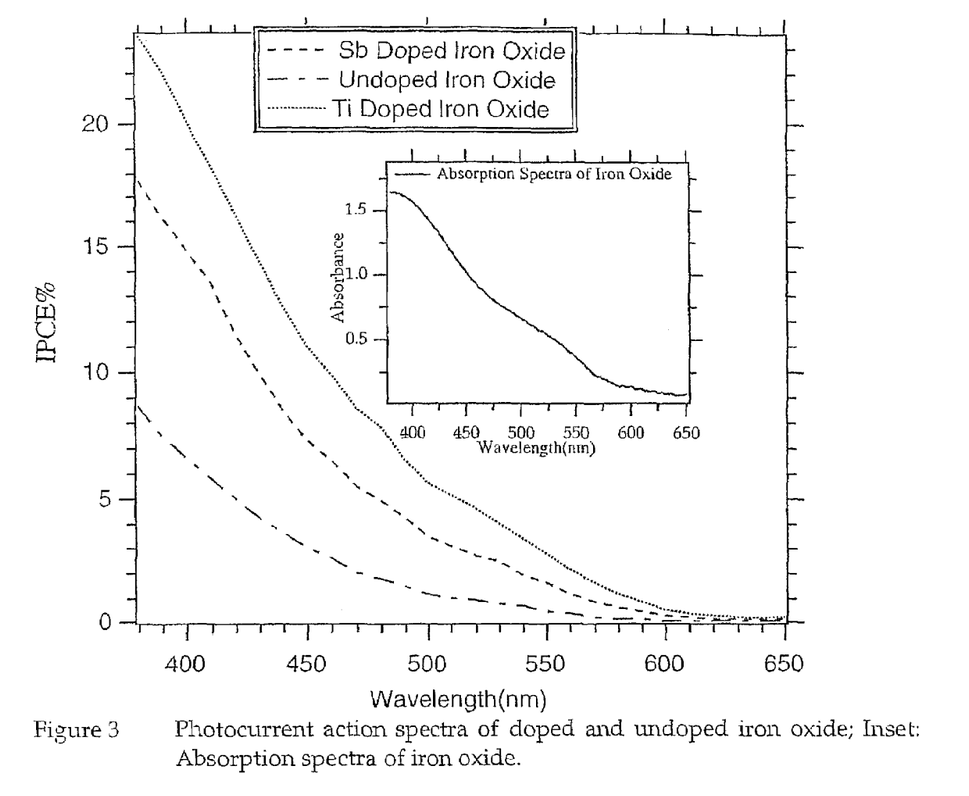
FIG. 3 shows the photocurrent action spectra of iron oxide doped with the different dopants, that is Sb. Ti compared with iron oxide that is not doped. IPCE %, means (Incident Photon-to Current Efficiency in percents). The diagram in the inset shows the absorption spectra of iron oxide as a function of the wavelength of the light.

The spectral response of the photocurrent is shown in FIG. 3. Between the two dopants, it was found that $Ti^{4+}$ doping shifts the spectral response of the layer more towards visible wavelength (red shift), when compared to $Sb^{5+}$ dopant. Sb doping also helps in spectral red shift but less effectively. Such spectral shift will improve the light harvesting property of the electrode.

Figure 4:
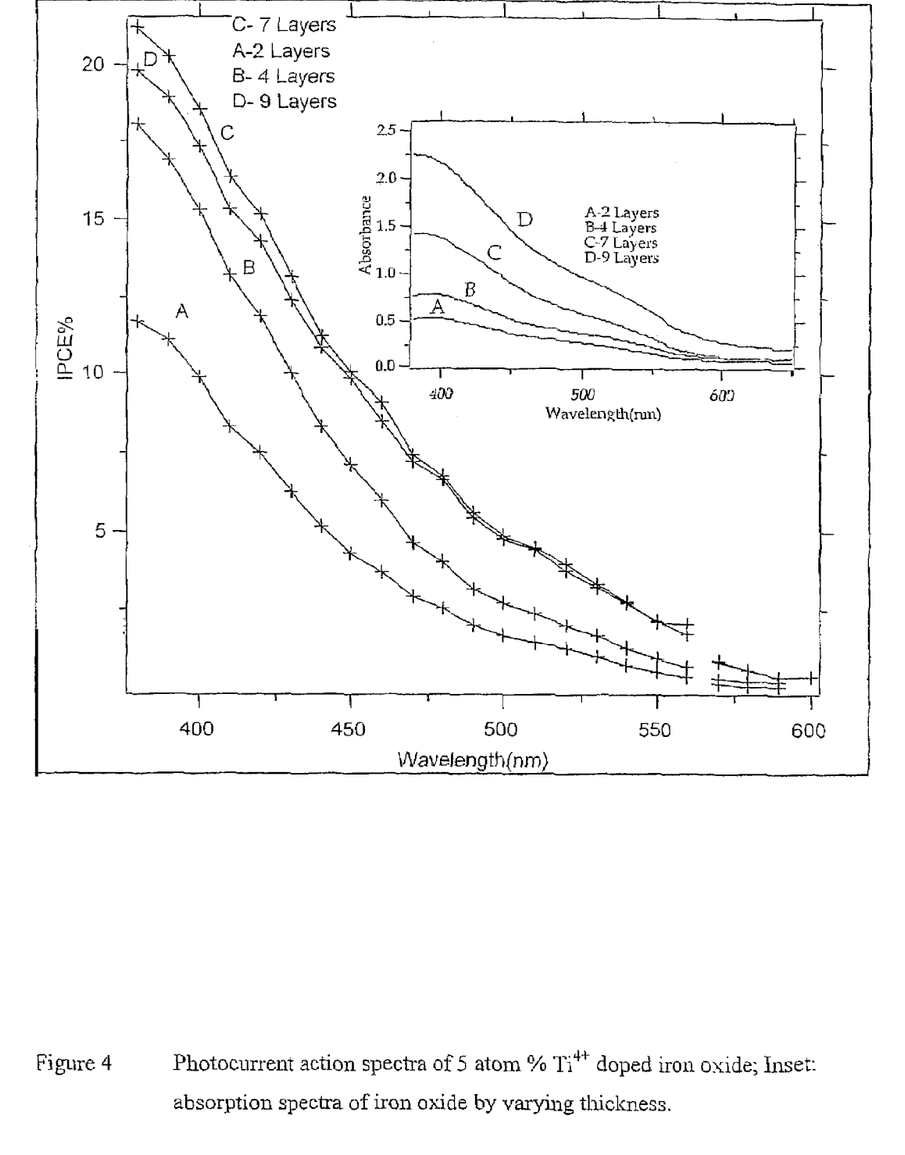
FIG. 4 illustrates the photocurrent action spectra of films with different numbers of superimposed iron oxide layers. The diagram in the inserted window shows the absorbance of iron oxide films with different number of layers (thickness) for light of different wavelength.

The effect of number of sprayed layers was also studied. Results are shown in FIG. 4. It was observed that even though the light absorbance increases with increasing number of layers, the highest IPCE (incident photons to current efficiency) was noticed with 7 layers. Thereafter, the IPCE started decreasing again.

Figure 5:
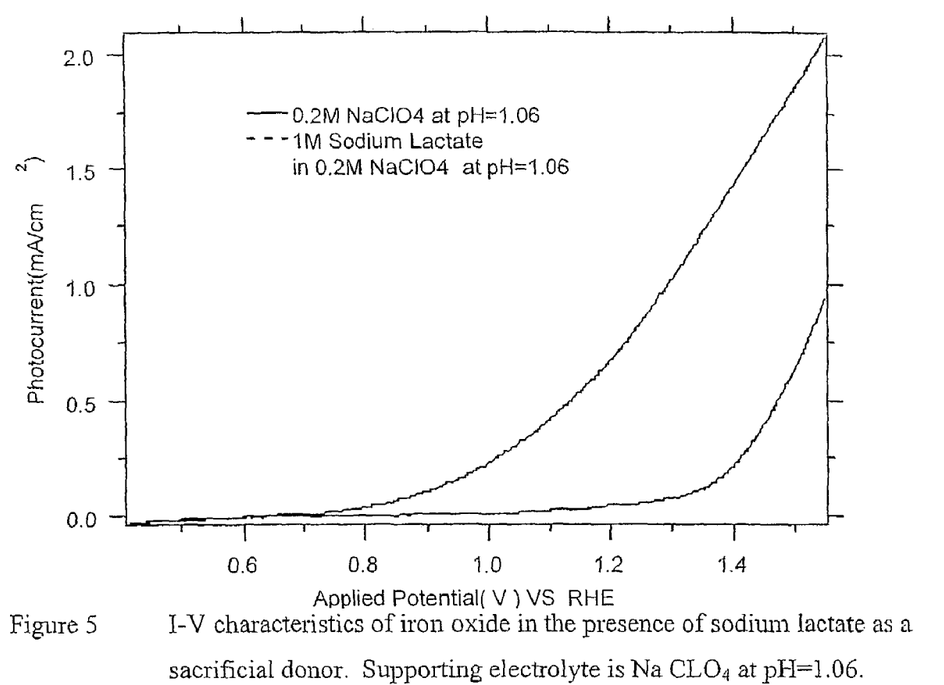
FIG. 5 illustrates the I-V characteristics of iron oxide in the presence of sodium lactate as a sacrificial donor. The supporting electrolyte is aqueous $NaCLO_4$ at pH=1.06.

The effect of adding sacrificial donors to the electrolyte surrounding $Fe_2O_3$ electrode was also investigated. FIG. 5 shows the improvement in the current voltage characteristics of such a system.

The Photocatalytic film of semiconducting iron oxide ($Fe_2O_3$), contains an n-dopant, or a mixture of n-dopants, or a p-dopant or a mixture of p-dopants. Electrode consists of a substrate, with one or more films or photocatalytic arrangements of film of semiconducting n-doped or p-doped iron oxide ($Fe_2O_3$) e.g. on the surface of one side of the substrate or on the surface of different sides. The photoelectrochemical cell comprises electrodes with a film or with films of the n-doped or p-doped semiconducting iron oxide ($Fe_2O_3$). The semiconducting iron oxide ($Fe_2O_3$) film can be manufactured with a spray pyrolysis process or a sol gel process. The system for the direct cleavage of water with visible light, into hydrogen and oxygen comprises one or more of the photoelectrochemical cells with photocatalytic films. The system can be a tandem cell system, comprising the photoelectrochemical cell with the doped iron oxide ($Fe_2O_3$) film.

Figure 6:
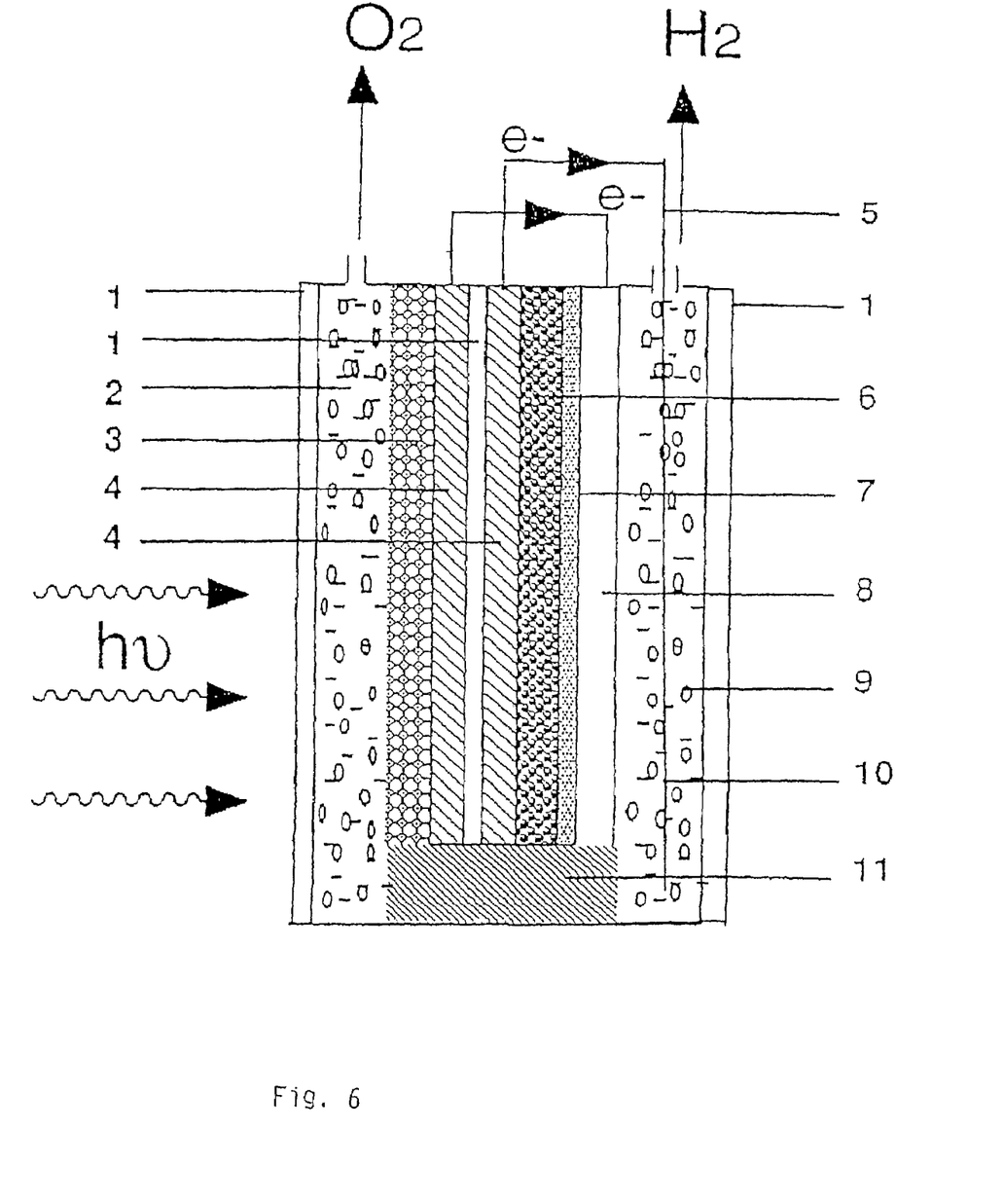
FIG. 6 shows a schematic drawing of a so-called tandem cell that operates as a water photolysis device.

A schematic drawing of a water photolysis device, a tandem cell, is illustrated in FIG. 6. The device consists of two photo systems connected in series. The cell on the left contains the aqueous electrolyte that is subjected to water photolysis. The electrolyte is composed of water as a solvent to which an electrolyte has been added for ionic conduction. Saline seawater can also be used as a water source in which case the addition of electrolyte becomes superfluous. Light enters from the left side of the cell through a glass window 1. After traversing the electrolyte 2 it impinges on the back wall of the cell constituted by a mesoporous semiconductor film 3 composed of doped $Fe_2O_3$. The latter is deposited onto a transparent conducting oxide film 4, made from a material such as fluorine doped tin dioxide that serves as current collector which is deposited on the glass sheet 1. The oxide absorbs the blue and green part of the solar spectrum while the yellow and red light is transmitted through it. The yellow and red part of the solar spectrum is captured by a second cell mounted behind the back wall of the first cell. The second cell contains a dye sensitized mesoporous $TiO_2$ film. Its functions is a light driven electric bias increasing the electrochemical potential of the electrons that emerge-from the film under illumination to render the reduction of water to hydrogen possible. It consists of a transparent conducting oxide film 4 deposited on the back side of the glass sheet 1 constituting the back wall of the first cell. The conducting oxide film is covered by the dye-derivatized nanocrystalline titania film 6. The latter is in contact with the organic redox electrolyte 7 and the counter electrode 8 consisting of a glass which is rendered conductive on the side of the organic electrolyte by deposition of a transparent conductive oxide layer. Behind the counterelectrode there is a second compartment 9 containing an aqueous electrolyte of the same composition as in the front compartment 2. Hydrogen is evolved at the cathode 10 which is immersed in the second electrolyte compartment. The two electrolyte compartments 2 and 10 have the same composition and are separated by an ion conducting membrane or a glass frit 11.

We shall now discuss a specific embodiment of such a tandem device achieving the direct cleavage of water into hydrogen and oxygen by visible light. A thin film of nanocrystalline tungsten trioxide absorbs the blue part of the solar spectrum.

The valence band holes ($h^+$) created by band gap excitation of the oxide serve to oxidize water forming oxygen and protons:

while the conduction band electrons are collected on the conducting glass support forming the back wall of the first photocell. From there on they are fed into the second photocell that consists of a dye sensitized nanocrystalline $TiO_2$ film. The latter is mounted directly behind the $WO_3$ film capturing the green and red part of the solar spectrum that is transmitted through the top electrode. The role of the second photocell is merely that of a photo driven bias. The electrochemical potential of the electrons is sufficiently increased by passing through the second photocell that they can reduce the protons produced during water oxidation to hydrogen.

The overall reaction corresponds to the splitting of water by visible light.

Semiconducting oxides, such as $WO_3$ and $Fe_2O_3$ are the materials of choice for the photo-anode as they are stable under operation resisting to both dark and photo corrosion. Tungsten trioxide and ferric oxide are so far the only known and readily available oxide semiconductors that are capable of producing oxygen using visible light. The electrons generated in the oxide are collected by the conducting glass and are subsequently fed into a second photocell that is placed directly behind the oxide film. The photo-active element of this second cell is a dye sensitized mesoporous $TiO_2$ capturing the yellow and red light that is transmitted through the oxide electrode. It serves as a photo-driven bias increasing the electrochemical potential of the photoelectrons produced by band gap excitation of the oxide to render reduction of water to hydrogen feasible.

The invention claimed is:

1. A system for the direct cleavage of water into hydrogen and oxygen using visible light, the system comprising a tandem cell consisting of two superimposed and electrically connected photoelectrochemical cells; a photoactive material present in a top compartment of the top cell being a film or an arrangement of layers of films of iron oxide deposited on a conducting glass and placed in contact with an aqueous electrolyte solution; said oxide comprising an n-dopant, a p-dopant, a mix of n-dopants or a mix of p-dopants and absorbing a blue and a green part of the solar emission spectrum to generate oxygen and protons from water and transmitting a yellow and a red part of the solar emission spectrum to a bottom photoelectrochemical cell, mounted, in the direction of the light, behind the top cell and comprising a dye sensitized photovoltaic film; said bottom cell converting the yellow, red and near infrared portion of the light in particular sunlight, to drive the reduction of the protons, produced in the top cell during the water oxidation process, said reduction of protons to hydrogen gas taking place in an electrolyte compartment mounted behind the bottom cell and being separated from the top cell compartment where oxygen is evolved by a glass frit or an ion conducting membrane.

2. A system for the cleavage of water by light, the system comprising:
   a first photocell comprising photoactive semiconducting iron oxide which generates oxygen and protons when immersed in an aqueous electrolyte and illuminated by light of a first range of wavelengths; and
   a second photocell connected electrically to said first photocell and to an electrode, the second photocell comprising a dye sensitized mesoporous photovoltaic film which generates a voltage at said electrode when said dye sensitized mesoporous photovoltaic film is illuminated by light of a second different range of wavelengths and the electrode is immersed in the aqueous electrolyte; wherein said voltage reduces said protons to hydrogen; and said semiconducting iron oxide comprises an n-dopant, a p-dopant, a mix of n-dopants or a mix of p-dopants.

3. A system according to claim 2, wherein said first range of wavelengths is generally that of blue and/or green light.

4. A system according to claim 2, wherein said dye sensitized mesoporous photovoltaic film is titanium dioxide, and said second range of wavelengths is generally that of yellow and/or red and/or near infra-red light.

5. A system according to claim 2, wherein said semiconducting oxide is deposited on a conducting substrate or conducting glass.

6. A system according to claim 2, wherein said aqueous electrolyte comprises seawater.

7. A system according to claim 2, wherein said first and second photocells are arranged one behind the other, so that said first photocell is superimposed on said second photocell.

8. A system according to claim 2, further comprising a chamber for holding the aqueous electrolyte, the chamber comprising first and second compartments in fluid communication with one another, said first photocell being immersed in electrolyte in said first compartment, and said electrode being immersed in electrolyte in said second compartment, the arrangement being such that oxygen is evolved for collection in said first compartment and hydrogen is evolved for collection in said second compartment.

9. A system according to claim 8, wherein the first and second compartments are separated from one another by means of a glass frit or an ion conducting membrane.

10. A system according to claim 2, further comprising a chamber for holding the aqueous electrolyte, said first photocell and said electrode being immersed in said electrolyte in said chamber, the arrangement being such that hydrogen and oxygen are evolved in said chamber.

* * * * *

UNITED STATES PATENT AND TRADEMARK OFFICE
CERTIFICATE OF CORRECTION

PATENT NO.         : 7,271,334 B2
APPLICATION NO.    : 10/343272
DATED              : September 18, 2007
INVENTOR(S)        : Michael Gratzel and Ravindranathan Thampi It is certified that error appears in the above-identified patent and that said Letters Patent is hereby corrected as shown below:

Column 1, lines 9-10:
"... producing such a film and to the precaution of an electrode composed of ion oxide ..." should read:

--... producing such a film and to the preparation of the electrode composed of iron oxide ...--

Column 1, line 16:
"... produces oxygen from water tinder illumination. ..." should read:

--... produces oxygen from water under illumination. ...--

Column 1, lines 50-51:
"... illustrated by way of example by tie accompanying diagrams." should read:

--... illustrated by way of example by the accompanying diagrams.--

Column 1, lines 53-54:
"... characteristics of $Ti^4+$ doped iron oxide films or ..." should read:

--... characteristics of $Ti^{4+}$ doped iron oxide films or ...--.

UNITED STATES PATENT AND TRADEMARK OFFICE
CERTIFICATE OF CORRECTION

PATENT NO. : 7,271,334 B2
APPLICATION NO. : 10/343272
DATED : September 18, 2007
INVENTOR(S) : Michael Gratzel and Ravindranathan Thampi It is certified that error appears in the above-identified patent and that said Letters Patent is hereby corrected as shown below:

Column 1, lines 55-56:
"... characteristics of $Sb^5+$ doped iron oxide films or ..."
should read:

--... characteristics of $Sb^{5+}$ doped iron oxide films or ...--

Column 4, Line 50, equation reads:

"$H_2O \; H_20.5O_2$"   should read   --$H_2O \; H_2 +0.5 \; O_2$--

Signed and Sealed this

Seventeenth Day of March, 2009

JOHN DOLL
*Acting Director of the United States Patent and Trademark Office*